Patented Aug. 29, 1939

2,170,995

UNITED STATES PATENT OFFICE 2,170,995

ETHYLENE GLYCOL ARYLOXY-ACETATES

Ernest F. Grether, William R. Shawver, and Russell B. Du Vall, Midland, Mich., assignors to The Dow Chemical Company, Midland, Mich., a corporation of Michigan No Drawing. Application October 30, 1935, Serial No. 47,406

6 Claims. (Cl. 260—473)

This invention concerns certain new aryloxy fatty acid esters of polyhydroxy alcohols and a method of making the same. It particularly concerns ethylene glycol aryloxy-acetates having the general formula

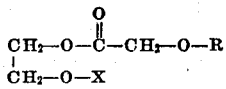

wherein R represents an aryl group and X represents hydrogen or an aryloxy-acetyl group. The term "aryl", as herein employed, refers to any aryl or substituted aryl group such as the phenyl, naphthyl, halo-phenyl, halo-naphthyl, alkyl-phenyl, alkyloxy-phenyl or diphenyl group, etc.

Our ethylene glycol aryloxy-acetates are, in most instances, white crystalline compounds, which are comparatively stable against hydrolysis, decomposition by heat, and discoloration by light. These new compounds are useful as plasticizers for cellulose ethers, cellulose esters, and synthetic resins. The invention, then, consists in the new compounds and method of making the same hereinafter fully described and particularly pointed out in the claims.

An ethylene glycol aryloxy-acetate may be prepared by heating a mixture of an aryloxy-acetic acid and ethylene glycol, at a pressure not greatly exceeding atmospheric, to a temperature at which reaction occurs, and thereafter separating the ester product from the reacted mixture, e. g. by fractional distillation, crystallization, etc. The aryloxy-acetic acid and ethylene glycol may be employed in any desired proportions, the mono-ester usually being obtained in higher yield when an excess of ethylene glycol is present in the reaction mixture, and the di-acetate resulting in optimum yield when 2 molecular equivalents of the aryloxy-acetic acid are employed per mole of ethylene glycol. The reaction proceeds most smoothly and rapidly at temperatures between 100° and 180° C., but may be carried out at lower or higher temperatures, if desired. During the heating operation water vapor is evolved by the reaction mixture and is removed from the reaction zone. For convenience, the reaction is usually carried out at atmospheric pressure or slightly above, e. g. at a pressure not exceeding 10 pounds per square inch, but it may advantageously be carried out under vacuum for the purpose of facilitating the removal of water from the mixture and thereby promoting more rapid and complete reaction. Ordinarily, the reaction is substantially complete after from 3 to 10 hours of heating under the conditions just described.

In a modification of this method, ethylene glycol diaryloxy-acetates may be prepared by reacting together an aryloxy-acetic acid and an ethylene glycol mono-aryloxy-acetate substantially as described above. By operating in this manner, pure di-acetates may be prepared wherein the two substituting aryl groups are dissimilar.

If desired, a catalyst such as an inorganic acid, e. g. sulphuric acid; acid salt, e. g. sodium acid sulphate; benzene-sulphonic acid, etc., may be employed in the above method to promote rapid reaction at relatively low temperatures, but the reaction proceeds smoothly and rapidly in the absence of such catalysts under the conditions described above.

The following examples describe certain of our new ester products and their preparation, but are not to be construed as limiting the invention. Each of the aryloxy-acetic acids used as reactants in the examples was prepared by refluxing a mixture of an alkali phenolate, sodium chloroacetate, and water, and thereafter separating the aryloxy-acetic acid products from the reaction mixture.

Example I

A mixture of 60.8 grams (0.4 mol) of phenoxy-acetic acid, and 12.4 grams (0.2 mol) of ethylene glycol was heated at temperatures gradually increasing from 100° to 170° C. Water was distilled off as formed during the reaction, and the amounts thereof measured from time to time to determine the extent of reaction. The mixture was heated in such manner for approximately 8 hours, i. e. until water vapor was no longer evolved, at the close of which time the quantity of water collected indicated that the reaction was 90 per cent complete. The reacted mixture was poured with stirring into 200 cubic centimeters of 95 per cent ethyl alcohol, whereby the ester product was precipitated. The precipitate was separated by filtration, washed with cold ethyl alcohol, and air-dried. 54.5 grams (0.165 mol) of ethylene glycol di-(phenoxy-acetate), was thereby obtained as a white, crystalline solid, of melting point 92° C. The product is soluble in benzene, slightly soluble in ethyl alcohol, insoluble in water, and has the formula

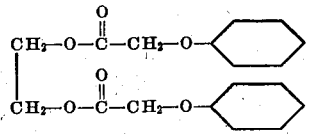

Example II

A mixture of 74.6 grams (0.4 mol) of 2-chlorophenoxy-acetic acid and 12.4 grams (0.2 mol) of ethylene glycol was heated at temperatures gradually increasing from 120° to 165° C. for 9 hours, water being distilled continuously from the mixture during said period of heating. The ester product was then separated from the reaction mixture as in Example I, whereby 72 grams (0.181 mol) of ethylene glycol di-(2-chlorophenoxy-acetate) was obtained. Said product is a white crystalline material, melting at 107° C. It has the formula

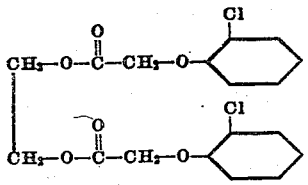

Example III

A mixture of 90 grams (0.4 mol) of 2-phenylphenoxyacetic acid, of melting point 108°–111° C., and 12.4 grams (0.2 mol) of ethylene glycol was heated for 7 hours at temperatures ranging between 120° and 165° C., substantially as described in Example I. The reacted mixture was then cooled and the unreacted beginning materials extracted therefrom with ethyl alcohol. As a residue from the extraction, there was obtained 83.5 grams (0.173 mol) of ethylene glycol di-(2-phenylphenoxyacetate) in the form of a substantially colorless viscous liquid, having the specific gravity 1.183 at 60°/60° C. Said ester product has the formula

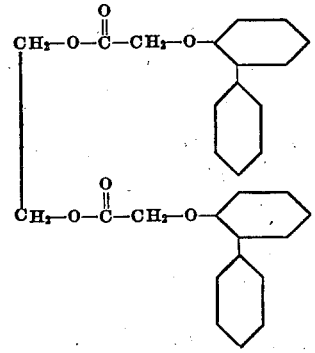

Example IV

A mixture of 83 grams (0.4 mol) of 4-tertiary butyl phenoxy-acetic acid, of melting point 97° C., and 12.4 grams (0.2 mol) of ethylene glycol was heated for 8.5 hours at 120°–160° C., after which the reaction product was isolated as in Example I. There was obtained 71 grams (0.161 mol) of ethylene glycol di-(4-tertiary-butyl-phenoxyacetate). Said product is soluble in chloroform and ether, slightly soluble in benzene, and melts at approximately 77° C. It has the formula

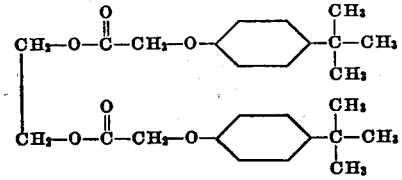

Example V

A mixture of 81 grams (0.4 mol) of beta-naphthoxyacetic acid and 12.4 grams (0.2 mol) of ethylene glycol was reacted for 6 hours at temperatures ranging between 130° and 160° C. The reacted mixture was then cooled and washed with ethyl alcohol to remove unreacted acid and glycol from the ester product. As a residue there was obtained 75 grams (0.174 mol) of ethylene glycol di-(beta-naphthoxy-acetate) as a fine powder melting at 117°–119° C. Said compound has the formula

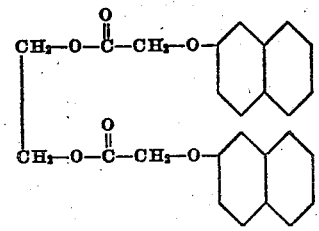

Example VI

A mixture of 37 grams (0.2 mol) of 2-chlorophenoxyacetic acid, 34.4 grams (0.2 mol) of phenoxy-acetic acid, and 12.4 grams (0.2 mol) of ethylene glycol was heated for 3.5 hours at temperatures gradually increasing from 106°–121° C., substantially as described in Example I. 70 grams of a mixed ethylene glycol ester of 2-chlorophenoxy-acetic acid and phenoxyacetic acid boiling at 265°–275° C. at 0.5 inch of mercury pressure was obtained. The product was first obtained as a light amber fluid of specific gravity 1.268 at 60°/60° C., but after standing for several days it crystallized in the form of a white oily solid melting at temperatures ranging from 40° to 70° C.

Example VII

A mixture of 152 grams (1.0 mol) of phenoxyacetic acid and 100 grams (1.61 mols) of ethylene glycol was heated at a temperature of approximately 140° C. for 7 hours, after which the reacted mixture was fractionally distilled to obtain ethylene glycol mono-phenoxy-acetate. This compound is a white, crystalline solid melting at 60°–61° C., boiling at approximately 175° C. at 10 millimeters of mercury absolute pressure and having the formula

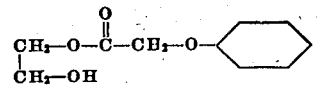

Example VIII

A mixture of 39.2 grams (0.2 mol) of ethylene glycol mono-phenoxy-acetate, 40.6 grams (0.2 mol) of beta-naphthoxyacetic acid, and 0.5 gram of benzene sulphonic acid was heated for 3 hours at approximately 140° C. The ester product was then separated from the reaction mixture as in Example I, whereby a substantially quantitative yield of ethylene glycol mono-(phenoxy-acetate)-mono-(beta-naphthoxy-acetate) was obtained. This compound is a white, crystalline solid, melting at 115° C. It has the formula

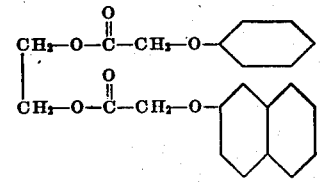

Other modes of applying the principle of our invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. An ethylene glycol aryloxy-acetate having the general formula

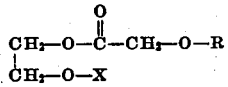

wherein R represents an aryl group and X represents one of the groups consisting of hydrogen and an aryloxy-acetyl radical.

2. An ethylene glycol mono-(aryloxy-acetate) having the general formula

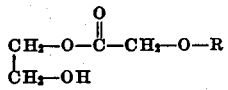

wherein R represents an aryl group.

3. An ethylene glycol di-(aryloxy-acetate) having the general formula

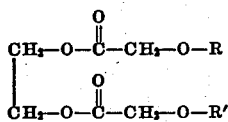

wherein R and R' represent aryl groups.

4. Ethylene glycol mono-(phenoxy-acetate), a crystalline compound melting at approximately 60° C., and having the formula

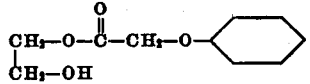

5. Ethylene glycol di-(phenoxy-acetate), a crystalline compound melting at approximately 92° C., and having the formula

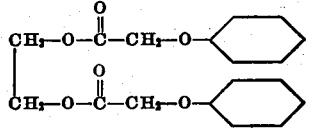

6. Ethylene glycol mono-(phenoxy-acetate)-mono-(naphthoxy-acetate), a crystalline compound melting at approximately 115° C., and having the formula

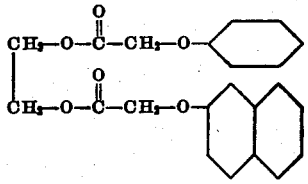

ERNEST F. GRETHER.
WILLIAM R. SHAWVER.
RUSSELL B. DU VALL.